United States Patent Office 3,755,563
Patented Aug. 28, 1973

3,755,563
METHOD AND COMPOSITION FOR ATTRACTING AND COMBATING INSECTS, IN PARTICULAR BARK BEETLES
Jean P. Vité, Beaumont, Tex., assignor to Boyce Thompson Institute for Plant Research, Inc.
No Drawing. Filed Aug. 12, 1969, Ser. No. 849,491
Int. Cl. A01n 17/14, 9/28
U.S. Cl. 424—84
10 Claims

ABSTRACT OF THE DISCLOSURE

A method is described for combating invertebrate animals such as bark bettles by regulating the aggregation of them. The method exploits chemical compositions having a content of attractants comprising the class of dioxabicyclo compounds exemplified by 1,5 - dimethyl-6,8 - dioxabicyclo[3.2.1]octane, used alone, or in combination with normal terpenoid compounds of tree resins or in combination with normal terpenoid compounds of tree resins and a compatible biocide.

CROSS-REFERENCE TO RELATED APPLICATION

The subject matter of the present application deals with compositions of matter and uses of the compounds disclosed in my co-pending U.S. application, Ser. No. 849,494 filed Aug. 12, 1969.

BACKGROUND OF THE INVENTION (1) Field of the invention

The present invention concerns a method for regulating the aggregation of invertebrate animals, in particular bark beetles, as well as chemical compositions having a content of attractants comprising the class of dioxabicyclo compounds exemplified comprising the class of dioxabicyclo compounds exemplified by 1,5-dimethyl-6,8-dioxabicyclo[3.2.1]octane, used alone, or in combination with normal terpenoid compounds of tree resins or in combination with normal terpenoid compounds of tree resins and compatible biocides in order to simultaneously attract and combat invertebrate animals.

Recently, animal attractants called "pheromones" have excited particular interest in the field of pest management. The term "animal attractant," of course, means a material which induces the approach of animals to the site from which the attraction emanates. "Pheromone," on the other hand, describes a substance secreted by an animal which in any way influences the behavior of other animals of its own kind.

Ideally, attractants should excite the attention of animals at a considerable distance. In any case, they usually do not constitute the ultimate reward which the animal seeks but serve merely as chemical messengers directing it to some more gratifying objective, such as a receptive mate, palatable fare or a comfortable place in which to lay eggs. When guided by pheromones, as of those of this invention, the animal pursues all three of these objectives; thus, these volatile constituents play an essential role in the perpeturation of the species. Fortunately, the same agent which is so critical to animal reproduction may be turned by man into the agent for animal destruction.

The inventor early discovered that yound female bark beetles of the genus Dendroctonus released some sort of attractive material immediately after penetrating the bark of a pine tree which precipitated an immediate mass attack of the tree by a horde of both sexes of the species. The origination of these attractive substances, known as "pheromones," was traced to the hindgut of the beetles and it was discovered that they were released most readily during the period of exertion in subduring a resistant tree. Studies were initiated to determine the nature of these pheromones and produce them synthetically with the hope that they could be used to manipulate free-flying populations of beetles in the forest.

From the start, the need for a strong force which could be harnessed to aggregate bark beetles, such as those of genus Dendroctonus and co-inhabitants such as species of Ips and Scolytus, was apparent. The bark beetles now rank among the most perniciuos tree destroyers. For every tree in the United States ravaged by a hostile fire, the bark beetle devastates five of them. Although an entomological census would probably show that there are about thirty two species of bark beetles of consequence, it is perhaps fortunate that only four or five of them ever play serious havoc with trees in a particular region.

Wholesale spraying of the habitats of these insects with even the most baneful of pesticides usually proves to be a futile, if not deleterious exercise, since bark beetles spend most of their time safely situated underneath tree bark where they mate and reproduce and rear their young. Indeed, indiscriminate spreading of toxic chemicals may do more harm than good if many other animals predacious of beetles come in contact with the lethal spray deposits while seeking their prey. The predators may thus be untimely dispatched before they can execute this natural function of capturing and destroying the young beetles of a new brood as they emerge from a tree. Chemical control of this sort has been further complicated by difficulty in locating the beetle infestations before a new brood has dispersed to other areas.

In the 1920's, it appeared that either prodigal logging or holocaustic fires were going to cause the extinction of East Texas conifers. Now, although pestilential fires still worry forest conservationists, it is the tiny bark bettle which threatens to render the pine tree a relic for study by natural historians. The souther pine beetle (Dendroctonus frontalis, Zimm.) has demonstrated a ravenous appetite for coniferous trees and appears bent on laying waste not only Texas forests but those over the whole eastern portion of the United States and Central America as well. The same is true for the western pine-beetle (Dendroctonus brevicomis, Lec.) and the Douglas-fir beetle (Dendroctonus pseudotsugae, Hopk.) in the West.

Since the majority of the southern and western states rely upon their timber industries for economic stability, every acre of wilderness must be made to produce a maximum number of trees. These regions can ill afford the crippling ravages of fire or the catastrophic losses caused by predacious insects. Moreover, the problem of timber devastation is being aggravated by rising operating costs and the decrement of forested land as a result of urban expansion, reservoir construction, recreation and park facilities, and many other deforesting uses of real estate. Thus, the survival of these forests and of shade trees, let alone the timber industry, depend upon the discovery and use of more effective control measures against the woodland insect, particularly the baleful Dendroctonus bettles.

The mobilization by scolytid beetles, including those of the Dendroctonus and Ips genera, against their arboreal hosts appears to take place in three stages; first, the insects must search out and choose a suitable host tree; then they must attack it en masse and set up colonies; from there they may attack neighboring trees. Host finding is either random or direct by host odors. The mass attack, however, is guided by attractants-pheromones-generated by the insects themselves. In both the Dendroctonus and Ips groups, the mechanism of pheromone release is defecation and the probable sites of elaboration and concentration are the Malpighian tubes and hindgut area.

The attractants, which draw fellow insects at a considerable distance, are produced by the host-selecting sex and are released only after the insectile emitter is comfortably entrenched in fresh host material. In the Dendroctonus genus, the attractiveness of infested trees and logs is highest during the early phases of attack reaching a surcease when feeding begins. The pheromones responsible are excreted in the feces of the male and female beetles. The pheromones of Ips species, in contrast, are present throughout feeding in the frass of the male beetles only. Also, factors other than odors may be important to mass attraction; for example, beetles may display a strong preference for vertical rather than horizontal landing objects or vice versa.

To overcome the resistance offered by more robust trees, the southern pine beetle, *D. frontalis,* disperses olfactory stimulants as long as it is prevented from feeding in the tree. Thus, vigorous trees with healthy water balances can usually ward off feeding by the beetles, but small, drought-debilitated trees succumb to beetle penetration much more easily and are often converted to insect fodder soon after attack.

The story is not yet complete however. In waging combat against a vigorous tree, the western and southern pine beetles continue discharging attractive odors as long as they are prevented from indulging their hunger for a Pinus repast. Thus, although large trees may defend themselves with copious resiny secretions, at the same time, the attacking beetles keep producing more volatile attractants until the insectile congregation reaches a size sufficient to overwhelm the tree's resin flow and to allow undisturbed consumption of the phleom tissue. This capacity of the beetles to "call in more help" enables them to vanquish eventually the most vigorous trees. Susceptible trees, such as drought-affected ones, have little resin flow and hence represent easy prey for even a relatively few beetles.

The pheromone draws beetles long distances under endemic conditions because beetles in an endemic area respond more quickly to different levels of attraction. How far the emerging beetles fly, however, depends largely on the availability of attractant sources in the area of emergence. In the early spring, for example, there may not be any freshly attacked trees in an infected area. Without nearby attractant sources, the beetles disperse. Likewise, rainy weather may dilute attractant residues so much that beetles can no longer detect them. On the other hand, when provided with nearby attractant sources, emerging beetles fly but a short distance. This synchrony of emergence and attraction accounts for the expansion and collapse of individual beetle spots in the forest. When beetles emerge and attractants disperse in an area at the same time, the beetles stay and attack new trees. Thus, the spot enlarges. Conversely if no attractants are around at the time of emergence, the beetles scatter and the spot appears to become "inactive." Concurrent with the buildup of attacks in an infested tree, an increase in landing frequency occurs on neighboring trees as the attractant emanates outward from the attacked tree. Normally, the nearest tree receives the largest amount of attractant and, therefore, is next in line for a beetle invasion. These beetles, in turn, begin to release attractant and soon the second tree becomes the focus of beetle activity. And so, tree by tree the infestation enlarges.

At present, the best and only practical way to retard the annihiliation of America's timberland by Dentroctonus beetles and other invertebrate animals is the prompt severence and removal of killed timber where possible, and by the largely indiscriminate spraying of toxicants. None of these systems, however, even when diligently applied by the best collaborative efforts of the timber industry, state governments and the federal forest service, have proved successful. Despite these zealous efforts, losses in the United States from bark beetles continue to mount. Rather modest-sized forest localities, such as the southern pines of south-eastern Texas and western white pines of north central Idaho, have sustained losses ranging up to a million board feet per day during some seasons in the past decade as a result of Dentroctonus onslaughts. The Douglas fir of the Northwest suffers endemic losses every year from another species and our neighbors in Honduras have seen forty percent of their soft wood timber resources destroyed during this same period.

Pest management is made even more difficult by the deleterious effect of pesticides on ecological systems and the near-hysteria of the public at large stemming from the belief that they are exposed to a real danger from residues of pesticides in their food. Predators, parasites, and competitors attracted to beetle-infested areas are decimated as they land on insecticide-suffused trees.

This impairment of the normal biological balance in the forest seems to be particularly severe in Texas where *Dendroctonus frontalis* historically created havoc on southern pine species for two or three years and then subsided as the population of predators increased. However, as chemical controls were applied quite widely the predators proved less effective. In other localities, such as north central Idaho, the predators may not be such a predominant factor in suppressing predacious bettles so chemicals might, therefore, be used to advantage once the bark beetles had been attracted to an accessible locality in the forest of *Pinus monticolae.* Unfortunately, a general treatment throughout the forest is not practical because of the logistics of seeking out and treating infested trees in rugged terrain. Nevertheless, by making the beetles move to preselected spots, a combination of pheromone and insecticide would make a potent weapon for combating these pests with minimum hazard to the forest ecology.

SUMMARY OF THE INVENTION

The purpose of this invention, therefore, is to develop a specific invertebrate animal attractant by means of which populations of bark beetles and other invertebrate pests may be manipulated or eradicated and, at the same time, the safety of humans, food supplies, the environmental quality and wildlife may be assured.

Another purpose of this invention is to develop an insect attractant, which will orient the flight of insects, particularly beetles, from far away to a specifically treated plot, to combine with this attractant certain attractive supplements that will encourage beetles to land at the precise spot chosen by the practitioner of the invention and to lure other destructive animals such as predator beetles which will be available to destroy the bark beetles when they land. Where such predators are unavailable in sufficient numbers to destroy the bark beetles, other control measures utilizing one or more deadly chemical and physical forces will have to be used. Among these biocidal agents would be a combination of a potent, persistent insecticide such as lindane, DDT, or carbaryl to name only a few potential representatives, use of mechanical traps or trap trees that would permit removal and destruction of the beetles, and use of chemosterilants or electrocution.

Additional purposes and objects of the present invention will manifest themselves from the following description thereof.

Described as broadly as can be, the present invention resides in the discovery of a composition which attracts certain invertebrate animals, in particular bark beetles, comprising oxygen-containing heterobicyclic compounds having structures defined by the formula:

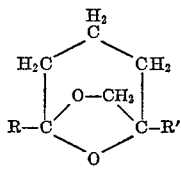

wherein R and R' represent members of the group consisting of hydrogen and lower alkyl radicals, by itself alone or in combination with normal terpenoid compounds of tree resins or in combination with normal terpenoid compounds of tree resins and a compatible biocide.

The invention also lies in the utilization of these animal attractants in combination with an agent for animal control, e.g., with animal traps or biocidally active substances, and possibly, foodstuffs for the effective control of these pests. When used in combination with appropriate chemical or physical exterminators, preferably with chemical insecticides, the animal attractants of the invention may provide specific local animal eradicators. They may be prepared by synthetic methods and used for a wide variety of invertebrate animals, in particular bark beetles of the genera Dendroctonus and Ips, also some clerid beetles, ostomid beetles and Wedetera. Physical types of exterminators include mechanical, electrical or thermal devices or natural systems such as resistant host trees or non-host trees.

DESCRIPTION OF THE PREFERRED EMBODIMENT

Females of the *D. frontalis* species yield only a little of the preferred embodiment of the newly discovered pheromone but, fortunately, hindguts of emergent male *D. brevicomis* produce considerably larger amounts of the same compound. Bioassay, spectral and gas-chromatographic evidence all confirm that the aggregating component produced by *D. frontalis*, *D. brevicomis* and *D. pseudotsugae* are identical.

Isolation of the new volatile was first achieved by the diethyl ether extraction of about 6,500 hindguts of male *D. brevicomis*. The ether extract was distilled to a 5-milliliter concentrate and then fractionated by preparative thin-layer chromatography on Brinkman's "Silica Gel G." Ten percent diethyl ether in chloroform was used as the developing solvent. The active compound was contained in the fraction with an $R_f$ value of 0.7 as determined by gas-liquid chromatography (GLC). The active material was eluted from the absorbent with diethyl ether and purified by GLC on a 10 feet x 0.25 inch stainless steel column of 10 percent "Carbowax" 20 M on 60/80 mesh "Chrom-W" at 110° C. injections were made directly on the column; nitrogen flow rate was 60 cm.$^3$/min. The active compound (~0.3 mg.) had a retention time of 7.5 min. The molecular composition of the active compound, as determined by high resolution mass spectrometry, corresponds to $C_8H_{14}O_2$ (measured, 142.0992; calculated, 142.0994). The following prominent peaks were observed: m/e 142 (17 percent) M, 114 (6 percent) M—$C_2H_4$, 112 (8 percent) M—$CH_2O$, 100 (49 percent) M—$C_2H_4O$, 72 (88 percent) M—$C_2H_2O$—$C_2H_4$ and 43 (100 percent) $C_2H_3O$. The infrared spectrum ($CCl_4$ solvent) showed no absorptions characteristic of hydroxyl or carbonyl groups. Strong absorptions occurred in the C—O stretching region between 1,115 and 1,025 cm.$^{-1}$. The absorption bands of unequal intensity occurred at 1,380 and 1,390 cm.$^{-1}$ attributable to two methyl groups in different structural environments. The nuclear magnetic resonance spectrum ($CDCl_3$ relative to $Si(CH_3)_4$ in Hz.) showed: 79 (3 protons, singlet), 85 (3 protons, singlet), 98 (6 protons, broad multiplet), 236 and 205 (AB quartet, $J_{AB}$=7 Hz.).

These spectral data indicated that the active compound was 1,5 - dimethyl - 6,8 - dioxabicyclo[3.2.1]octane. The same compound may be produced synthetically by a one-step process. The spectral characteristics of the synthetic compound were the same as those of the compound isolated from natural sources.

The choice of supplementary substance to promote landing and feeding will be determined, as a general rule, by the species of beetles being manipulated and the host involved. Generally, alpha-pinene or trans-verbenol or a combination of the two would be preferred for *D. frontalis* on *Pinus taeda* and other southern pines whereas 3-carene or myrcene might be used for a *D. brevicomis* on *Pinus ponderosa* to illustrate the general principles involved but not to restrict the scope of the invention. Oleoresins from the tree can be substituted for the specific compounds.

FIELD EVALUATION TESTS

A series of experiments have been made on *D. frontalis* near Beaumont, Texas and *D. brevicomis* near Grass Valley, Calif., at the Boyce Thompson Institute's experimental forests located in these areas. The number of flying beetles captured in a field olfactometer that simulated a tree trunk baited with 1 milligram of 1,5-dimethyl-6,8-dioxabicyclo[3.2.1]octane (frontalin) in a glass capillary tube was small. However, when released in the presence of oleoresin from *P. taeda*, it was fully competitive with natural sources for attracting beetles. The data in Table 1 shows that any combination of frontalin and oleoresin attracted eleven beetles in ten minutes whereas oleoresin or oleoresin and trans-verbenol alone were ineffective.

TABLE 1

Field response during 10-minute periods of *D. frontalis* to olfactometers set 10 meters apart

| Test material | No. of beetles responding (10 min. test periods) | | | | | Sex ratio (male: female) |
|---|---|---|---|---|---|---|
| | 1 test | 2 tests | 3 tests | Total | Average | |
| Frontalin | 0 | 1 | 2 | 3 | 1 | |
| Frontalin, trans-verbenol and oleoresin | 7 | 17 | 8 | 32 | 10.7 | 1:0.3 |
| Crushed *D. frontalis* (2,500 male and female) and oleoresin | 7 | 4 | 2 | 13 | 4.3 | 1:2.3 |
| Oleoresin | 0 | 0 | 0 | 0 | 0 | |
| Frontalin and oleoresin | 6 | 17 | 9 | 32 | 10.7 | 1:0.4 |
| Crushed *D. frontalis* (2,500 male and female and oleoresin | 3 | 19 | 12 | 34 | 11.3 | 1:1.8 |
| Oleoresin and trans-verbenol | 0 | 0 | 0 | 0 | 0 | |

Other tests were performed in the field with olfactometers to determine the best ratio of frontalin to alpha-pinene for *D. frontalis* beetles. The results of these tests are shown in Table 2:

TABLE 2

Field response during 3-hour periods of *D. frontalis* to mixtures of one part frontalin and 1 to 1,000 parts of alpha-pinene

| Mixture used, frontalin in ml./hr. | Alpha pinene in ml./hr. | Number of SPB caught |
|---|---|---|
| 1 | 1 | 275 |
| 0.1 | 1 | 690 |
| 0.01 | 1 | 272 |
| 0.001 | 1 | 173 |

Frontalin, even by itself, has proved to be a potent attractant for *Thanasimus dubius*, a bark beetle predator.

Table 3.—Field response of *Thanasimus dubius*, predator of the southern pine beetle, to olfactometers containing frontalin and resin

| Mixture used: | Number of *T. dubius* responding during 2 hours |
|---|---|
| 10 µl. Frontalin | 134 |
| 10 µl. Frontalin and 1 ml. resin | 123 |
| 1 ml. resin | 9 |

Frontalin was also field tested along with another beetle pheromone, exo-7-ethyl-5-methyl-6,8-dioxabicyclo[3.2.1]octane, for which a trivial name "brevicomin" has been proposed. Only the combination of frontalin, brevicomin plus resin (or 3-carene), however, is competitive with natural sources of attractant for *D. brevicomis* under field conditions. This effect is not to be mistaken for synergism however; each compound has a particular function. Brevicomin attracts mostly males, frontalin mostly females and resin arrests the responding insects. The following table shows how frontalin increases the attractiveness of brevicomin and oleoresin about threefold:

Table 4.—Field response of *D. brevicomis* to olfactometers

| Test material: | Average number of beetles responding |
|---|---|
| Brevicomin (1 mg.) and oleoresin (1 g.) | 14.4 |
| Frontalin (1 mg.) and oleoresin (1 g.) | 15.7 |
| Feeding *D. brevicomis* females (control) | 17.0 |
| Frontalin (1 mg.), brevicomin (1 mg.) and oleoresin (1 g.) | 45.2 |
| Frontalin (1 mg.) and brevicomin (1 g.) | 15.3 |
| Oleoresin (1 g.) | 0.5 |

Furthermore, frontalin per se is highly attractive to *D. brevicomis* (Table 5) and *D. pseudotsugae* (Table 6), a serious pest of Douglas-fir forests.

Table 5.—Field response of *D. brevicomis* to baited traps

| Test material: | Average number of beetles responding |
|---|---|
| Frontalin (5 mg./hr.) | 56 |
| Frontalin and 3-carene (5 mg./hr.) | 74 |

Table 6.—Field response of *D. pseudotsugae* to olfactometers

| Test material: | Average number of beetles responding |
|---|---|
| Frontalin (5 mg./hr.) | 19 |
| Frontalin (5 mg./hr.) and Douglas-fir billet containing 25 female beetles | 50 |
| Douglas-fir billet with 25 female beetles | 22 |

The methods of destroying invertebrate animals, particularly bark beetles, using the attractants of the invention fall into two categories: concentration methods and dispersal methods through confusion. Methods vary in accordance with the forest practices applied. By one concentration method, insects are attracted to host trees by use of the attractants of the invention which are then harvested carrying away the beetle population to the saw mill where they are destroyed in the debarker. By another concentration method, the insects are attracted to resistant or unsuitable hosts that do not permit brood development. Another effective concentration method is the attraction of the insects to suitable hosts using the attractants of the invention which are treated with chemicals either destructive to the insects or detrimental to broad development.

With mixtures of frontalin and a biocide, bark beetles and many other animals can be conveniently lured to their extermination. Biocides for use in this invention may be any of the common materials known to kill bark beetles and other insects. Illustrative of the wide variety of insecticides which may be used with the attractants of this invention are the following: DDT, lindane, allethrin, chlordane, malathion and rotenone. Insecticides, of course, can be effectively used in traps or on trees baited with the attractants of the invention. This eliminates the need to spread the insecticides unnecessarily and helps prevent killing useful insects and other animals.

Practical use of the attractants of the invention is also made in insect surveys where traps are baited with the attractants. The catches indicate the size and location of infestation; economical use of appropriate pest management systems can then be determined.

The idea behind the dispersal methods or pheromone masking is, instead of orienting the insects to a trap, to control their sex life by keeping them from finding each other. For example, one technique of pheromone masking would be to permeate the atmosphere with the pheromone which attracts mostly males. This prevents the males of the species from orienting to and inseminating females. Field trials have indicated that economic control of some insects over large areas may be possible with this method using the attractants of the invention.

The attractants of this invention may be used per se for other purposes without the addition of a poison. They may serve, for example, to guide certain insects in the fertilization of plants, one of the desirable functions some of them may perform. They may also be made use of in controlling the flight, in the issuing warnings for the protection of trees and other plants and in research on population dynamics.

The attractants of the invention may be used in actual practice in the field in different ways as is known in the art. They may be formulated with other materials or impregnated on a carrier or used in traps or similar devices different from the ones described above. As various changes could be made in the above compositions and methods without departing from the scope of the invention, it is intended that all matter contained in the above description shall be interpreted as illustrative and not in a limiting sense.

I claim:

1. A method of attracting bark beetle species of the genus Dendroctonus, which comprises permeating the atmosphere in an area infested with said beetles with an effective attractant amount of a 6,8-dioxabicyclo[3.2.1]octane of the formula:

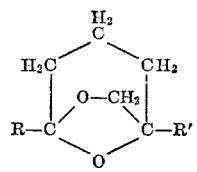

wherein R and R' are methyl.

2. A method of combating infestations of bark beetle species of the genus Dendroctonus, which comprises baiting a trap with an attractant amount of a 6,8-dioxabicyclo[3.2.1]octane of the formula:

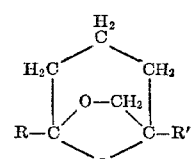

wherein R and R' are methyl.

3. A method of combating infestations of bark beetle species of the genus Dendroctonus, which comprises baiting a trap with an attractant amount of a 6,8-dioxabicyclo[3.2.1]octane of the formula:

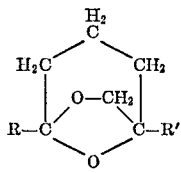

wherein R and R' are methyl placing the baited trap in an infested area, and subsequently spreading an insecticidal amount of an insecticide over the area.

4. A composition for combating bark beetle species of the genus Dendroctonus, which comprises an insecticidal amount of an insecticide and an effective attractant amount of a 6,8-dioxabicyclo[3.2.1]octane of the formula:

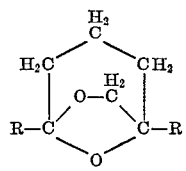

wherein R and R' are methyl.

5. An attractant composition for bark beetle species of the genus Dendroctonus, which comprises an attractant 1,5-dimethyl - 6,8 - dioxabicyclo[3.2.1]octane in combination with from about 1 part to about 1,000 parts based on the attractant of a normal terpenoid compound of a host tree resin.

6. A method of attracting bark beetle species of the genus Dendroctonus, which comprises permeating the atmosphere in an infested area with an effective attractant amount of the composition of claim 5.

7. The attractant composition of claim 5 further comprising from 1 part to 1,000 parts based on weight of attractant therein of exo-7-ethyl-5-methyl-6,8-dioxabicyclo[3.2.1]octane.

8. A method of attracting bark beetle species of the genus Dendroctonus which comprises distributing on an infested area an attractant amount of the composition of claim 7.

9. The composition of claim 5 which further comprises from about 1 part to about 1,000 parts trans-verbenol based on the attractant material.

10. The composition of claim 9 which further comprises an insecticidal amount of an insecticide.

References Cited
UNITED STATES PATENTS

| | | | |
|---|---|---|---|
| 2,511,890 | 6/1950 | Whetstone | 260—340.9 |
| 2,511,891 | 6/1950 | Whetstone | 260—340 |

FOREIGN PATENTS

| | | | |
|---|---|---|---|
| 646,829 | 11/1950 | Great Britain | 260—340.9 |

OTHER REFERENCES

Science, vol. 159, Feb. 23, 1968, pp. 889–891.
Nature, vol. 221, Feb. 1, 1969, pp. 477–478.
Science, vol. 164, June 13, 1969, pp. 1284–1285.
J. Insect. Physiol., vol. 15, 1969, pp. 1617–1622.
J.A.A. Renwick (reprint Boyce Thompson Inst. 24(13) pp. 337–342, October–December 1970).

ALBERT T. MEYERS, Primary Examiner
F. E. WADDELL, Assistant Examiner

U.S. Cl. X.R.
424—196, 278, 343

UNITED STATES PATENT OFFICE
CERTIFICATE OF CORRECTION

Patent No. 3,755,563          Dated August 28, 1973

Inventor(s) Jean P. Vite

It is certified that error appears in the above-identified patent and that said Letters Patent are hereby corrected as shown below:

Column 1, lines 39-40, delete the phrase "comprising the class of dioxabicyclo compounds exemplified".

Column 2, line 1, delete "yound" and insert --young--.

Column 3, line 47, delete "phleom" and insert --phloem--.

Column 5, line 37, delete "Wedetera" and insert --Medetera--.

Column 9, line 25, change within the formula

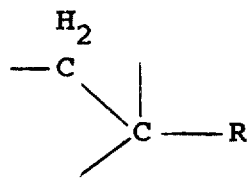   to --  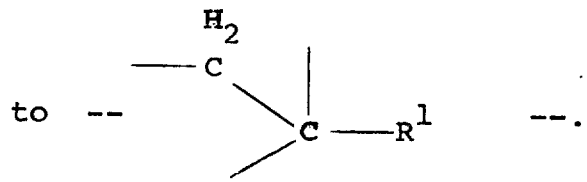   --.

Signed and sealed this 15th day of January 1974.

(SEAL)
Attest:

EDWARD M. FLETCHER, JR.          RENE D. TEGTMEYER
Attesting Officer                Acting Commissioner of Patents